(12) United States Patent
Dasgupta et al.

(10) Patent No.: US 9,813,462 B2
(45) Date of Patent: Nov. 7, 2017

(54) UNIFIED DYNAMIC EXECUTABLE MEDIA PLAYLISTS ACROSS CONNECTED ENDPOINTS

(71) Applicant: ITTIAM SYSTEMS PTE. LTD., Singapore (SG)

(72) Inventors: Sattam Dasgupta, Bangalore (IN); Anirudh Seth, Bangalore (IN)

(73) Assignee: ITTIAM SYSTEMS PTE. LTD., Singapore (SG)

( * ) Notice: Subject to any disclaimer, the term of this patent is extended or adjusted under 35 U.S.C. 154(b) by 306 days.

(21) Appl. No.: 14/615,452

(22) Filed: Feb. 6, 2015

(65) Prior Publication Data

US 2015/0222675 A1  Aug. 6, 2015

(30) Foreign Application Priority Data

Feb. 6, 2014  (IN) .............................. 544/CHE/2014

(51) Int. Cl.

| G06F 15/16 | (2006.01) |
|---|---|
| H04L 29/06 | (2006.01) |
| H04N 21/25 | (2011.01) |
| H04N 21/262 | (2011.01) |
| H04N 21/845 | (2011.01) |

(52) U.S. Cl.
CPC .......... *H04L 65/403* (2013.01); *H04L 65/604* (2013.01); *H04L 65/608* (2013.01); *H04N 21/252* (2013.01); *H04N 21/26258* (2013.01); *H04N 21/845* (2013.01)

(58) Field of Classification Search
USPC ................................... 709/231, 217; 348/43
See application file for complete search history.

(56) References Cited

U.S. PATENT DOCUMENTS

| 7,934,159 | B1 * | 4/2011 | Rahman | ........... H04N 21/26258 715/716 |
|---|---|---|---|---|
| 7,941,739 | B1 * | 5/2011 | Mohammed | .......... G06F 9/5038 715/202 |
| 2005/0267948 | A1 * | 12/2005 | McKinley | .......... H04N 7/17336 709/217 |
| 2006/0242550 | A1 * | 10/2006 | Rahman | ............. H04N 21/4825 715/203 |
| 2009/0240732 | A1 * | 9/2009 | Amidon | ............... G11B 27/105 |

(Continued)

*Primary Examiner* — Tammy Nguyen
(74) *Attorney, Agent, or Firm* — Prakash Nama; Global IP Services, PLLC

(57) ABSTRACT

A system and method for generating a unified dynamic executable media playlist across connected endpoints for media play-out are disclosed. In one embodiment, endpoints are connected via a communication network. Each endpoint includes a media player and streamer module (MPSM). Further, a local media playlist is created, by the MPSM in each of the plurality of endpoints, using media residing in associated endpoints. Furthermore, the local media playlist is sent to one of the plurality of endpoints designated as a host by the MPSM in each of remaining endpoints. In addition, the unified dynamic executable media playlist is generated, by the MPSM in the host, by combining the received local media playlists and the local media playlist residing in the host. Also, the generated unified dynamic executable media playlist is sent, by the MPSM in the host, to each of the remaining endpoints for media play-out.

15 Claims, 4 Drawing Sheets

(56) References Cited

U.S. PATENT DOCUMENTS

| | | | | |
|---|---|---|---|---|
| 2012/0075465 A1* | 3/2012 | Wengrovitz | ........... | H04N 7/181 |
| | | | | 348/143 |
| 2014/0245147 A1* | 8/2014 | Amidon | ................ | G06F 3/0482 |
| | | | | 715/716 |
| 2015/0222675 A1* | 8/2015 | Dasgupta | .............. | H04L 65/403 |
| | | | | 709/231 |
| 2016/0044160 A1* | 2/2016 | Redmann | .......... | H04M 3/42204 |
| | | | | 379/88.03 |
| 2016/0065637 A1* | 3/2016 | O'Malley | ............. | H04L 67/306 |
| | | | | 709/231 |

* cited by examiner

| UNIFIED DYNAMIC EXECUTABLE MEDIA PLAYLIST N | | EDITABLE BY HOST |
|---|---|---|
| CONTRIBUTOR | ENDPOINT 'X' | NO |
| TYPE OF MEDIA | AUDIO STREAM | NO |
| PATH OF MEDIA | PATH NAME OF A SOURCE OF THE AUDIO STREAM | NO |
| BEFORE PLAY-OUT | CONTROL INSTRUCTIONS BEFORE PLAY-OUT | YES |
| DURING PLAY-OUT | CONTROL INSTRUCTIONS DURING PLAY-OUT | NO |
| AFTER PLAY-OUT | CONTROL INSTRUCTIONS AFTER PLAY-OUT | YES |
| UNIFIED DYNAMIC EXECUTABLE MEDIA PLAYLIST N+1 | | EDITABLE BY HOST |
| CONTRIBUTOR | ENDPOINT 'Y' | NO |
| TYPE OF MEDIA | IMAGE | NO |
| PATH OF MEDIA | PATH NAME OF A SOURCE OF THE IMAGE | NO |
| BEFORE PLAY-OUT | CONTROL INSTRUCTIONS BEFORE PLAY-OUT | NO |
| DURING PLAY-OUT | CONTROL INSTRUCTION DURING PLAY-OUT | YES |
| AFTER PLAY-OUT | CONTROL INSTRUCTIONS AFTER PLAY-OUT | NO |
| UNIFIED DYNAMIC EXECUTABLE MEDIA PLAYLIST N+2 | | EDITABLE BY HOST |
| CONTRIBUTOR | ENDPOINT 'Z' | NO |
| TYPE OF CONTENT | IMAGE | NO |
| PATH OF CONTENT | PATH NAME OF A SOURCE OF THE IMAGE | NO |
| BEFORE PLAY-OUT | CONTROL INSTRUCTIONS BEFORE PLAY-OUT | NO |
| DURING PLAY-OUT | CONTROL INSTRUCTIONS DURING PLAY-OUT | YES |
| AFTER PLAY-OUT | CONTROL INSTRUCTIONS AFTER PLAY-OUT | NO |

UNIFIED DYNAMIC EXECUTABLE MEDIA PLAYLISTS ACROSS CONNECTED ENDPOINTS

Benefit is claimed under 35 U.S.C 119(a) to Indian Provisional Patent Application Ser. No 544/CHE/2014 entitled "Unified dynamic executable content playlist across connected devices" by Ittiam Systems Pte. Ltd. filed on Feb. 6, 2014.

FIELD OF TECHNOLOGY

Embodiments of the present invention relate to media play-out. More particularly, embodiments of the present invention relate to unified dynamic executable media playlists across connected endpoints for the media play-out.

BACKGROUND

Now-a-days, increasing numbers of endpoints can be communicatively connected to receive and send media (e.g., an audio stream, an image a video stream and the like). For example, endpoints may include smart phones, tablets, and Internet protocol (IP) set-top boxes, and the like. Such endpoints may be capable of storing media, such as, mass media and/or user-generated media in local storages. Other than the local storages, the media may also be stored in cloud based storages. Given the diversity of the media and its sources, existing techniques may not be able to seamlessly aggregate the media across the endpoints.

BRIEF DESCRIPTION OF THE DRAWINGS

Embodiments of the present invention are illustrated by way of an example and not limited to the figures of the accompanying drawings, in which like references indicate similar elements and in which:

FIG. 3 is a table showing a unified dynamic executable media playlist, according to one embodiment.

Other features of the present embodiments will be apparent from the accompanying drawings and from the detailed description that follows.

DETAILED DESCRIPTION

In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide a unified dynamic executable media playlists across connected endpoints. The proposed technique is configured to generate unified dynamic executable media playlists, i.e., playlists having media aggregated across different participating endpoints in a communication network. The unified dynamic executable media playlists may include control instructions that define how the media is played. In one embodiment, the proposed technique includes an endpoint designated as a host for generating the unified dynamic executable media playlist which have media aggregated across the different participating endpoints. Further, these playlists can be executed to create an automated and/or semi-automated flow. In an example, these playlists can be stored locally or centrally on a server or cloud storage, for executing at a different point of time on a same or different endpoint in a session with multiple endpoints or just the associated endpoint. Also, the unified dynamic executable media playlist can be dynamically updated by the endpoints and managed by the host (i.e., a playlist manager).

Figure 1:
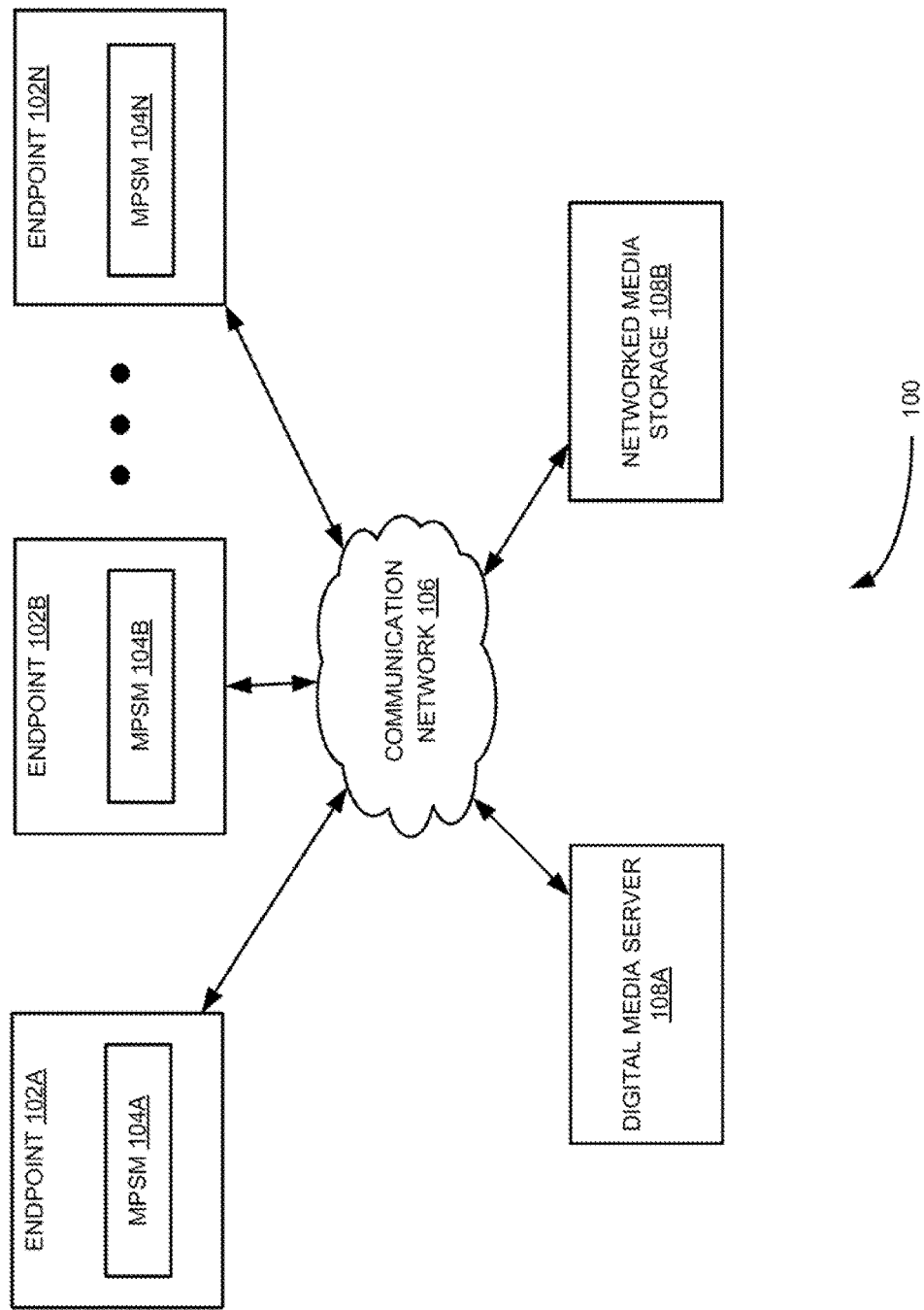
FIG. 1 illustrate a block diagram of a system for generating a unified dynamic executable media playlist across connected endpoints for media play-out, according to one embodiment.

FIG. 1 illustrates a block diagram of a system 100 for generating a unified dynamic executable media playlist across connected endpoints for media play-out, according to one embodiment. For example, the endpoints include smart phones, tablets, smart televisions, in-car entertainment devices, Internet protocol (IP) set-top boxes, personal computers and any appliance, machine or gadget with a media player. As shown in FIG. 1, the endpoints 102A-N are communicatively connected via a communication network 106. Exemplary communication network includes an IP network and the like. Further as shown in FIG. 1, the endpoints 102A-N include media player and streamer modules (MPSM) 104A-N, respectively.

In an example implementation for a media play-out session between the endpoints 102A-N, the endpoint 102A is designated as a host and the endpoints 102B-N are designated as remaining endpoints that are connected to the endpoint 102A designated as the host. In this example implementation, each of the MPSMs 104A-N creates a local media playlist out of media residing in associated endpoints 102A-N. Example media can be any digital media, such as an audio stream, an image, text, a video stream and the like. In an example, each of the MPSMs 104A-N creates the local media playlist out of the media residing in the associated endpoints 102A-N based on respective user preferences. Further, each of the MPSMs 104A-N embeds control instructions in the associated local media playlists. For example, the control instructions include duration of play-out, a sequence of the play-out, a volume of an audio stream, a resolution and frame rate of a video stream and the like. Furthermore, each of the MPSMs 104B-N sends the local media playlists in the associated endpoints 102B-N to the endpoint 102A. In one embodiment, each of the MPSMs 104B-N sends the associated local media playlists with the embedded control instructions to the endpoint 102A. In some scenarios, one or more of the endpoints 102A-N creates one or more associated local media playlists.

Figure 2:
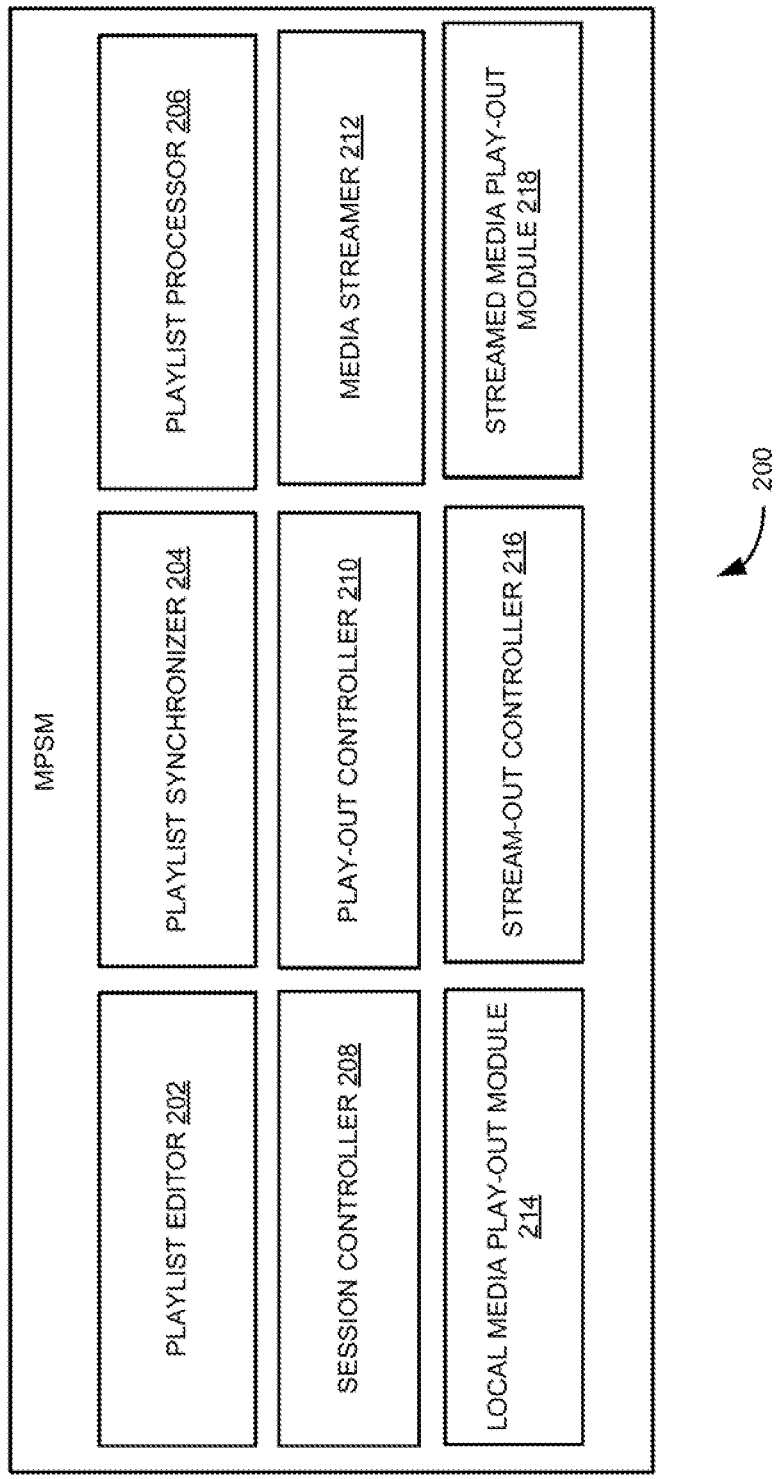
FIG. 2 is a block diagram illustrating components of a media player and streamer module (MPSM), such as shown in FIG. 1, according to one embodiment.

In addition, the MPSM 104A in the endpoint 102A generates the unified dynamic executable media playlist by combining the received local media playlists and/or the local media playlist residing in the endpoint 102A. An example unified dynamic executable media playlist is shown in a table 300 of FIG. 3. In addition, the MPSM 104A sends the generated unified dynamic executable media playlist to the endpoints 102B-N for the media play-out. In one embodiment, when the media associated with the unified dynamic executable media playlist is local to the endpoint 102A (i.e., residing in the endpoint 102A), the MPSM 104A play-out the media on the endpoint 102A and streams the media to the endpoints 102B—N based on the associated control instructions in the unified dynamic executable media playlist. In another embodiment, when the media associated with the unified dynamic executable media playlist is local to one of the endpoints 102B-N (e.g., the endpoint 102B), the MPSM 104B play-out the media on the end point 102B and streams the media to the endpoint 102A which in turn streams the media to other endpoints 102C-N based on the associated control instructions in the unified dynamic executable media playlist. Example components of the MPSMs 104A-N are shown in FIG. 2. In one embodiment, any one of the endpoints 102A-N can store the unified dynamic executable media playlist locally or in a digital media server 108A or in a networked media storage 108B via the communication network 106 for executing at a later point of time with same or a different end point having a MPSM. For example, one or more endpoints 102A-N can participate in a media play-out session or a new endpoint having a MPSM can execute the media at a same or different point of time using the unified dynamic executable media playlist which is stored on the network.

Referring now to FIG. 2, which is a block diagram illustrating components of a MPSM 200 (any of the MPSMs 104A-N shown in FIG. 1), according to one embodiment. As shown in FIG. 2, the MPSM 200 includes a playlist editor 202, a playlist synchronizer 204, a playlist processor 206, a session controller 208, a play-out controller 210, a media streamer 212, a local media play-out module 214, a stream-out controller 216, and a streamed media play-out module 218. In an embodiment, the playlist editor 202 can be used for creating and editing (delete, modify and sequence of content) a media playlist. The playlist synchronizer 204 can be used to send and receive media playlists. The playlist processor 206 can be used for creating a unified dynamic executable media playlist and for sending control instructions to the play-out controller 210 and stream-out controller 216. The session controller 208 can be used to control a media play-out session between endpoints. The local media play-out module 214 can be used to decode and play-out the media based on the control instructions received from the play-out controller 210. The media streamer 212 can be used to stream the media to other endpoints based on the control instructions received from the stream-out controller 216. The streamed media play-out module 218 can be used to play-out the media received from other endpoints.

In an example implementation, the MPSM 200 can reside and operate from each of endpoints in a media play-out session. In this example implementation, one of the endpoints is designated as a host of the media play-out session and other endpoints as remaining endpoints connected to the host. At the beginning of the media play-out session, one or more users of the endpoints are allowed to provide or input a preferred media out of media residing in associated end points. Further, the playlist editor 202 residing in each of the endpoints creates a local media playlist using the media residing in the associated endpoints or based on the user's preferred media. For example, a media playlist includes a path of media, a type of media, a sequence of media and the like. In an example embodiment, the playlist editor 202 in one or more of the endpoints can embed control instructions, which controls the play-out of the media, in associated local media playlists based on users inputs for the control instructions. For example, the control instructions can include duration of the play-out, a volume of an audio stream, a sequencing of the play-out, a resolution and/or frame rate of a video stream, and the like.

Furthermore, the playlist synchronizer 204 in the remaining endpoints sends associated local media playlists with the embedded control instructions to the host. At the host, the received local media playlists and local media playlist residing in the host are combined to create the unified dynamic executable media playlist using the playlist processor 206. The host can, using the playlist editor 202, delete, modify, sequence, content of the unified dynamic executable media playlist. Also, the host can modify all or a subset of the control instructions in the unified dynamic executable media playlist depending on an edit-ability attribute set by the associated remaining endpoint using the playlist editor 202. Once finalized, the host sends the unified dynamic executable media playlist to the remaining endpoints using the playlist synchronizer 204.

Further, the playlist processor 206 in the host extracts and sends the control instructions and path of the media to the play-out controller 210 and stream-out controller 216. The play-out controller 210 and stream-out controller 216 then uses the control instructions to control the play-out and stream-out of the media specified in the media play-out session between the endpoints. Furthermore, when the media is local to the host, then the local media play-out module 214 in the host decodes the media and play-out of the media as per the control instructions from the play-out controller 210. For the remaining endpoints, the media streamer 212 in the host encodes and streams the media as per playlist instructions (instructions, such as endpoints for which the media needs to be streamed and the like) and the control instructions from the stream-out controller 216, in one or more streams with specific formats, resolutions and the like to suit the remaining endpoints needs. Optionally, the host may not encode the media when the target endpoint can handle a coded format residing on the host.

In addition, when the media associated with the unified dynamic executable media playlist is local to one of the remaining endpoints (i.e., not local to the host), then the local media play-out module 214 in the one of the remaining endpoints decodes and play-out the media on the one of the remaining endpoints as per the corresponding control instructions from the play-out controller 210 of the one of the remaining endpoints or the host. For the other endpoints, the media streamer 212 of the one of the remaining endpoints encodes and streams the media as per the playlist instructions and control instructions of the stream-out controller 216 to the host. The host in turn decodes for local play-out using the streamed media play-out module 218 in the host. If necessary, the media streamer 212 of the host is configured to encode the decoded stream from the one of the remaining endpoints or retransmit the streamed media from the one of the remaining endpoints to other remaining endpoints. In an example, the media streamer 212 on the one of the remaining endpoints may be configured to encode and stream the media and let the play-out controller 210 and stream-out controller 216 of the host determine the control of the streamed media play on the host and the media streamer 212 on the host for the other endpoints as per the corresponding control instructions in the unified dynamic executable media playlist.

In some embodiments, any of the remaining endpoints can modify associated local media playlist using the playlist editor 202 and send the associated modified local media playlist to the host using the playlist synchronizer 204. The host in turn can update the unified dynamic executable media playlist using the playlist editor 202 in the host and send the updated unified dynamic executable media playlist to the remaining endpoints using the playlist synchronizer 204 in the host.

Referring now to FIG. 3, which is a table 300 showing a unified dynamic executable media playlist, according to one embodiment. As shown in FIG. 3, the unified dynamic executable media playlist includes an endpoint identity, a playlist number, a type of media, a path of the media, control instructions for three stages, i.e., before, during and after playing the media and the like. In an example, at any point an endpoint 'Y' can modify items or content on a local media playlist contributed by endpoint 'Y' using a playlist editor (i.e., the playlist editor 202 shown in FIG. 2). The endpoint 'Y' can then send the modified local media playlist to a host of a media play-out session using a playlist synchronizer (e.g., a playlist synchronizer 204 shown in FIG. 2) on the end point 'Y' over a communication network. Once the host modifies the received playlist, the playlist synchronizer in the host sends the modified unified dynamic executable media playlist to remaining end points in the media play-out session. The playlist synchronizers in the remaining endpoints in turn replace current unified dynamic executable media playlist with the modified unified dynamic executable media playlist. Any one of participants can store the unified dynamic executable media playlist locally or in cloud storage for executing at a later point of time with same or a different end point with a MPSM.

Figure 4:
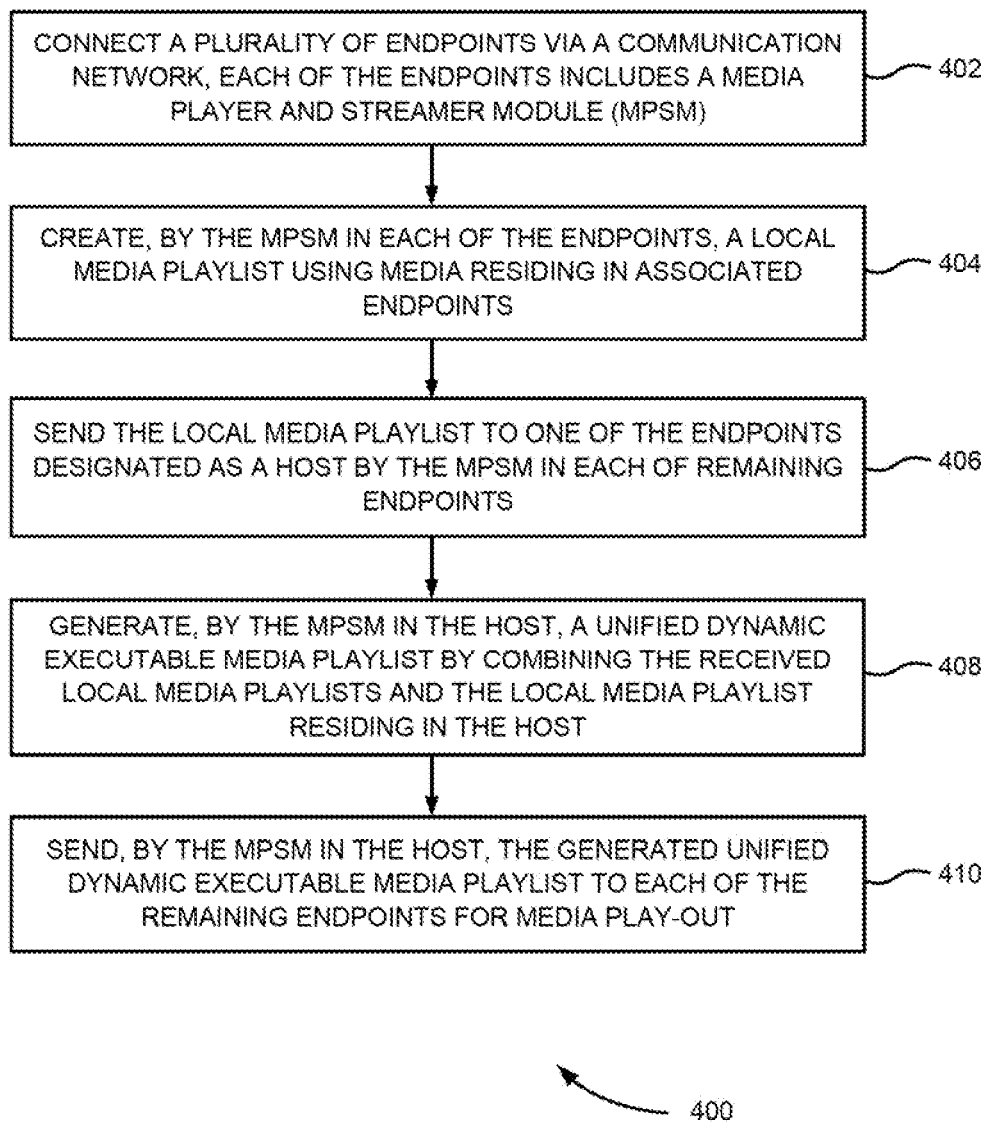
FIG. 4 illustrates a flow diagram of a method for generating a unified dynamic executable media playlist across connected endpoints for media play-out, according to one embodiment.

Referring now to FIG. 4, which illustrates a flow diagram 400 of a method for generating a unified dynamic executable media playlist across connected end points for media play-out, according to one embodiment. At block 402, the endpoints are connected via a communication network. Each of the endpoints includes a MPSM. At block 404, a local media playlist is created, by the MPSM in each of the plurality endpoints, using media residing in associated endpoints. Example media includes an audio stream, an image, text, a video stream and the like. In one embodiment, control instructions are embedded, by the MPSM in each of the plurality of endpoints, in the respective one of the local media playlist. At block 406, the local media playlist is sent to one of the endpoints designated as a host by the MPSM in each of remaining endpoints. In an example, the local media playlist with the embedded control instructions is sent to the one of the endpoints designated as the host by the MPSM in each of remaining endpoints. For example, the control instructions include duration of play-out, a sequence of the play-out, a volume of an audio stream, a resolution and a frame rate of a video stream and the like.

At block 408, the unified dynamic executable media playlist is generated, by the MPSM in the host, by combining the received local media playlists and the local media playlist residing in the host. At block 410, the generated unified dynamic executable media playlist is sent to each of the remaining endpoints for the media play-out by the MPSM in the host. In an example, when the media associated with the unified dynamic executable media playlist is local to the host, the media is played out on the host and the media is streamed to the remaining endpoints based on the control instructions, by the MPSM in the host. In another example, when the media associated with the unified dynamic executable media playlist is local to one of the remaining endpoints, the media is played out on the one of the remaining endpoints and the media is streamed to the host which in turn streams the media to other endpoints based on the control instructions. This is explained in more detail with reference to FIGS. 1 to 3.

In one embodiment, an article comprising a non-transitory computer readable storage medium having instructions thereon which when executed by a computing platform result in execution of the above mentioned method. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
   connecting a plurality of endpoints via a communication network, wherein each of the plurality of endpoints comprises a media player and streamer module (MPSM);
   creating, by the MPSM in each of the plurality of endpoints, a local media playlist using media residing in associated endpoints;
   embedding control instructions, by the MPSM in each of the plurality of endpoints, in the respective each one of the local media playlist;
   sending the local media playlist with the embedded control instructions to one of the plurality of endpoints designated as a host by the MPSM in each of remaining endpoints;
   generating, by the MPSM in the host, a unified dynamic executable media playlist by combining the received local media playlists and the local media playlist residing in the host, wherein the unified dynamic executable media playlist includes the control instructions to control lay-out and stream-out of the media; and
   sending, by the MPSM in the host, the generated unified dynamic executable media playlist to each of the remaining endpoints for media play-out.

2. The method of claim 1, wherein the control instructions are selected from the group consisting of duration of play-out, a sequence of the play-out, a volume of an audio stream, and a resolution and a frame rate of a video stream.

3. The method of claim 1, further comprising:
   performing at least one of:
      when the media associated with the unified dynamic executable media playlist is local to the host, playing out the media on the host and streaming the media to the remaining endpoints based on the control instructions, by the MPSM in the host; and
      when the media associated with the unified dynamic executable media playlist is local to one of the remaining endpoints, playing out the media on the one of the remaining endpoints and streaming the media to the host, by the MPSM in the one of the remaining endpoints, which in turn streams the media to other endpoints based on the control instructions.

4. The method of claim 1, wherein sending, by the MPSM in the host, the generated unified dynamic executable media playlist to each of the remaining endpoints for the media play-out, comprises:
  modifying content in the generated unified dynamic executable media playlist by the MPSM in the host; and
  sending, by the MPSM in the host, the modified unified dynamic executable media playlist to each of the remaining endpoints for the media play-out.

5. The method of claim 1, wherein the media is selected from a group consisting of an audio stream, an image, text and a video stream.

6. A system, comprising:
  a plurality of endpoints, wherein the plurality of endpoints are communicatively connected via a communication network, wherein each of the plurality of endpoints comprises a media player and streamer module (MPSM), wherein the MPSM in each of the plurality of endpoints creates a local media playlist using media residing in associated endpoints, wherein the MPSM in each of the plurality of endpoints embeds control instructions in the respective each one of the local media playlist, wherein the MPSM in one of the plurality of endpoints designated as a host receives the local media playlists associated with each of remaining endpoints with the embedded control instructions, wherein the MPSM in the host generates a unified dynamic executable media playlist by combining the received local media playlists and the local media playlist residing in the host, wherein the unified dynamic executable media playlist includes the control instructions to control play-out and stream-out of the media, and wherein the MPSM in the host sends the generated unified dynamic executable media playlist to each of the remaining endpoints for media play-out.

7. The system of claim 6, wherein the control instructions are selected from the group consisting of duration of play-out, a sequence of the play-out, a volume of an audio stream, and a resolution and a frame rate of a video stream.

8. The system of claim 6, wherein the MPSM in the host is further configured to play-out the media on the host and stream the media to the remaining endpoints based on the control instructions, when the media associated with the unified dynamic executable media playlist is local to the host.

9. The system of claim 6, wherein the MPSM in one of the remaining endpoints is configured to play-out the media on the one of the remaining endpoints and stream the media to the host which in turn streams the media to other endpoints based on the control instructions, when the media associated with the unified dynamic executable media playlist is local to the one of the remaining endpoints.

10. The system of claim 6, wherein the MPSM in the host modifies content in the generated unified dynamic executable media playlist and wherein the MPSM in the host sends the modified unified dynamic executable media playlist to each of the remaining endpoints for the media play-out.

11. The system of claim 6, wherein the media is selected from a group consisting of an audio stream, an image, text and a video stream.

12. A non-transitory computer-readable storage medium having instructions that when executed by a computing device, cause the computing device to:
  connect a plurality of endpoints via a communication network, wherein each of the plurality of endpoints comprises a media player and streamer module (MPSM);
  create, by the MPSM in each of the plurality of endpoints, a local media playlist using media residing in associated endpoints;
  embed control instructions, by the MPSM in each of the plurality of endpoints, in the respective each one of the local media playlist;
  send the local media playlist with the embedded control instructions to one of the plurality of endpoints designated as a host by the MPSM in each of remaining endpoints;
  generate, by the MPSM in the host, a unified dynamic executable media playlist by combining the received local media playlists and the local media playlist residing in the host, wherein the unified dynamic executable media playlist includes the control instructions to control play-out and stream-out of the media; and
  send, by the MPSM in the host, the generated unified dynamic executable media playlist to each of the remaining endpoints for media play-out.

13. The non-transitory computer-readable storage medium of claim 12, wherein the control instructions are selected from the group consisting of duration of play-out, a sequence of the play-out, a volume of an audio stream, and a resolution and a frame rate of a video stream.

14. The non-transitory computer-readable storage medium of claim 12, wherein the instructions further cause the computing device to:
  perform at least one of:
    when the media associated with the unified dynamic executable media playlist is local to the host, playing out the media on the host and streaming the media to the remaining endpoints based on the control instructions, by the MPSM in the host; and
    when the media associated with the unified dynamic executable media playlist is local to one of the remaining endpoints, playing out the media on the one of the remaining endpoints and streaming the media to the host, by the MPSM in the one of the remaining endpoints, which in turn streams the media to other endpoints based on the control instructions.

15. The non-transitory computer-readable storage medium of claim 12, wherein the media is selected from a group consisting of an audio stream, an image, text and a video stream.

* * * * *